United States Patent
Yasuda et al.

(10) Patent No.: US 6,802,650 B2
(45) Date of Patent: Oct. 12, 2004

(54) SLIDING ELEMENT, SLIDING STRUCTURE INCLUDING THE SLIDING ELEMENT, AND METHOD FOR PRODUCING MICROSCOPIC SURFACE STRUCTURE IN THE SLIDING ELEMENT

(75) Inventors: Yoshiteru Yasuda, Yokohama (JP); Makoto Kano, Yokohama (JP); Yutaka Mabuchi, Yokohama (JP); Shinji Asano, Yokohama (JP); Kenshi Ushijima, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 105 days.

(21) Appl. No.: 10/290,247

(22) Filed: Nov. 8, 2002

(65) Prior Publication Data

US 2003/0128903 A1 Jul. 10, 2003

(30) Foreign Application Priority Data

Dec. 20, 2001 (JP) ...................................... 2001-386939

(51) Int. Cl.$^7$ ............................................. F16C 17/00
(52) U.S. Cl. ......................... 384/276; 384/293; 384/294
(58) Field of Search ................................ 384/276, 286, 384/293, 294, 429, 430

(56) References Cited

U.S. PATENT DOCUMENTS

| | | |
|---|---|---|
| 4,538,929 A | 9/1985 | Ehrentraut et al. |
| 4,554,208 A | 11/1985 | MacIver et al. |
| 4,755,426 A | 7/1988 | Kokai et al. |
| 4,783,368 A | 11/1988 | Yamamoto et al. |
| 4,834,400 A | 5/1989 | Lebeck |
| 4,974,498 A | 12/1990 | Lemelson |
| 5,077,990 A | 1/1992 | Plath |
| 5,190,824 A | 3/1993 | Itoh |
| 5,205,188 A | 4/1993 | Repenning et al. |
| 5,237,967 A | 8/1993 | Willermet et al. |
| 5,249,554 A | 10/1993 | Tamor et al. |
| 5,462,362 A * | 10/1995 | Yuhta et al. ................. 384/293 |
| 5,466,431 A | 11/1995 | Dorfman et al. |
| 5,630,953 A | 5/1997 | Klink |
| 5,735,769 A | 4/1998 | Takemura et al. |
| 5,843,571 A | 12/1998 | Sho |

(List continued on next page.)

FOREIGN PATENT DOCUMENTS

| | | |
|---|---|---|
| EP | 0 529 327 A1 | 3/1993 |
| EP | 0 661 470 A2 | 7/1995 |
| EP | 0 731 190 B1 | 5/1999 |
| JP | 6-294307 A | 10/1994 |
| JP | 7-090553 A | 4/1995 |
| JP | 2000-504089 A | 4/2000 |
| WO | WO 92/02602 A1 | 2/1992 |
| WO | WO 93/21289 A1 | 10/1993 |
| WO | WO 01/05917 A1 | 1/2001 |

OTHER PUBLICATIONS

Database WPI, Week 200065, Nov. 28, 2000, Derwent Publications, Ltd., AN 2000640583, XP002240184, JP 2000–327484, Nov. 28, 2000.

(List continued on next page.)

Primary Examiner—Thomas R. Hannon
(74) Attorney, Agent, or Firm—Foley & Lardner LLP (57) ABSTRACT

A sliding structure including first and second sliding elements made of metal and including first and second sliding surfaces relatively slidable via a lubricating oil film therebetween, in which at least one of the first and second sliding surfaces having a microscopic surface structure including a base portion, dimples inward recessed from the base portion and separated from one another, and a peripheral portion defining the opening area of each of the dimples and extending along a periphery of each of the dimples. A ratio of a sum of opening areas of the dimples to an area of the at least one of the first and second surfaces is in a range of 5% to 60%. The peripheral portion has a height smaller than a thickness of the lubricating oil film.

26 Claims, 6 Drawing Sheets

U.S. PATENT DOCUMENTS

| | | | |
|---|---|---|---|
| 6,059,460 | A | 5/2000 | Ono et al. |
| 6,095,690 | A | 8/2000 | Niegel et al. |
| 6,146,019 | A * | 11/2000 | Andler et al. ............... 384/276 |
| 6,237,441 | B1 | 5/2001 | Nishioka et al. |
| 6,523,456 | B1 | 2/2003 | Kobayashi et al. |
| 6,524,212 | B2 | 2/2003 | Ushijima et al. |
| 2002/0090155 | A1 | 7/2002 | Ushijima et al. |
| 2002/0148430 | A1 | 10/2002 | Kano et al. |
| 2003/0162672 | A1 | 8/2003 | Shirahama et al. |

OTHER PUBLICATIONS

Japanese Industrial Standard, "Vickers Hardness Test—Test Method", JIS Z 2244, 1998, pp. 1–8 (with translation).

Japanese Industrial Standard, "High Carbon Chromium Bearing Steels", JIS G 4805, 1999, pp. 1–31 (with translation).

Meyer–Rässler, "Neuartige Lauffächen–Schutzverfahren für Kolben von Verbrennungsmotoren," VDI–Zeitschrift, 1942, vol. 86, No. 15/16, pp. 245 to 247.

Dr. Marx, "Surfaces and Contact Mechanics", XP–002233233, Google, Retrieved from the Internet, Mar 3, 2003, pp. 1–18.

Patent Abstracts of Japan, vol. 2000, No. 09, Oct. 13, 2000, JP 2000–170768, Jun. 20, 2000.

Patent Abstract of Japan, vol. 2000, No. 01 Jan. 31, 2000, JP 11–287329, Oct. 19, 1999.

Patent Abstracts of Japan, vol. 1996, No. 09, Sep. 30, 1996, JP 08–128448, May 21, 1996.

Kano et al., "Fricton Property of Hard Carbon film in Engine Oil", Japan Tribology Congress 1999, 5, Tokyo, Proceeding pp. 11 and 12.

Kano et al, "The Effect of ZDDP and MODTC Additives on Friction Properties of DLC and Steel Cam Follower in Engine Oil", Abstracts of Papers from $2^{nd}$ World Tribology Congress, Sep. 3–7, 2001, p. 342.

Japanese Industrial Standard, "Carbon Steels for Machine Structural Use", Japanese Standards Association, JIS G 4051, 1979, pp. 1–10.

Japanese Industrial Standard, "Chromium Steels", Japanese Standards Association, JIS G 4104, 1979, pp. 1–9.

"Standard Test Method for Separation of Representative Aromatics and Nonaromatics Fractions of High–Boiling Oils by Elution Chromatography", ASTM Designation: D 2549–91 (Reapproved 1995), pp. 895–900.

International Standard, "Petroleum products—Determination of Base Number—Perchloric Acid Potentiometric Titration Method", ISO 3771, Second Edition Aug. 15, 1994 pp. 1–8.

"Assessment of $2^{nd}$ and $5^{th}$ Order Irregularities of Surface Configuration by Means of Sections of Surfaces Definitions Relating to Reference System and Dimensions," DIN 4762, UDC 621–288:001.4 (Aug. 1960), pp. 1–4.

"Geometrical Product Specifications (GPS)—Surface Texture: Profile Method—Terms, Definitions and Surface Texture Parameters," International Standard, ISO 4287, TC 213 (1997), pp. 1–25.

Japanese Industrial Standard, "Chromium Molybdenum Steels", Japanese Standards Association, JIS G 4105, 1979, pp. 1–11.

Japanese Industrial Standard, "Surface roughness—Definitions and Designations", JIS B 0601, 1994, pp. 1–3 and 5–8.

Engine Oil Viscosity Classification—SAE J300 revised Apr. 1997, p. 133.

API Motor Oil Guide, Which Oil Is Right for You, American Petroleum Institute, Copyright 2002.

* cited by examiner

SLIDING ELEMENT, SLIDING STRUCTURE INCLUDING THE SLIDING ELEMENT, AND METHOD FOR PRODUCING MICROSCOPIC SURFACE STRUCTURE IN THE SLIDING ELEMENT

BACKGROUND OF THE INVENTION

The present invention relates to a sliding structure for use in various kinds of machines, and specifically, relates to a sliding structure bearing a load applied to a rotating shaft. More specifically, the invention relates to a sliding structure including relatively slidable elements of an internal combustion engine, namely, a crankpin (or a connecting rod journal) and a crank journal (or a main bearing journal) of a crankshaft and bearing metals used as counterparts of the crankpin and the crank journal, respectively. Further, the invention belongs to a technical field relating to a microscopic surface structure of a sliding surface of the sliding element of the sliding structure.

The crank journal and the crankpin of the crankshaft are typically known as the sliding elements used in internal combustion engines. The crankshaft is coupled to a piston within an engine cylinder via a connecting rod and operated to convert the reciprocating motion of the piston into rotation. The crankshaft is rotatably supported by bearing metals at the crank journal and the crankpin. The bearing metals are generally made of Cu—Pb based alloy, Al—Si—Sn based alloy or the like.

Recently, for the purpose of performing efficient power transmission and serving for enhancing fuel economy and reducing emission in view of environmental conservation, reduction of friction loss is required in addition to improvement in output and revolution of internal combustion engines for automobiles. A journal of the conventional crankshaft is ground to have a surface roughness Ra of about 0.2–0.5 $\mu$m, and then subjected to finishing with lapping tape to thereby have a surface roughness Ra of not more than 0.1 $\mu$m. Surface roughness Ra is prescribed in JIS B 0601-1994. A thickness of a lubricating oil film formed between a sliding surface of the journal of the crankshaft and a sliding surface of a bearing metal is calculated at about 1–2 $\mu$m or less under condition that the engine revolution number is in the usually operated range of 1500–2000 rpm. There has been studied reduction of sliding friction loss by decreasing surface roughness of the sliding surface of the journal of the crankshaft so as to smoothen the sliding surface. Japanese Patent Application First Publication No. 2000-504089 (corresponding to U.S. Pat. No. 6,095,690) and U.S. Pat. No. 4,538,929 disclose bearing metals having lubricating oil pockets on the sliding surfaces. These related arts aim to improve antiseizure properties of a sliding structure using the bearing metal and reduce friction loss thereof.

SUMMARY OF THE INVENTION

In order to smoothen the sliding surface of the journal of the crankshaft for the purpose of greatly reducing the friction loss, the sliding surface will be subjected to superfinishing. In this case, the production cost will increase. Otherwise, the sliding surface will be coated or impregnated with molybdenum disulfide superior in solid lubricating property. This will become expensive. Further, the layer of molybdenum disulfide formed on the sliding surface will be worn out during the sliding movement of the sliding surface. The durability of the journal of the crankshaft cannot be sufficiently obtained.

There is a demand to eliminate the above-described problems in the related arts. An object of the present invention is to provide a sliding structure in which opposed sliding elements are slidable relative to each other with a reduced resistance even if a lubricating oil film formed between sliding surfaces of the sliding elements has a relatively small thickness, the sliding structure serving for greatly reducing friction loss of the sliding elements.

In one aspect of the present invention, there is provided a sliding structure, comprising:

a first sliding element including a first sliding surface, the first sliding element being made of metal;

a second sliding element including a second sliding surface slidable relative to the first sliding surface via a lubricating oil film therebetween, the second sliding element being made of metal;

at least one of the first and second sliding surfaces including a microscopic surface structure including a base portion, dimples inward recessed from the base portion and separated from one another, a ratio of a sum of opening areas of the dimples to an area of the at least one of the first and second surfaces being in a range of 5% to 60%, and a peripheral portion defining the opening area of each of the dimples, the peripheral portion extending along a periphery of each of the dimples, the peripheral portion having a height smaller than a thickness of the lubricating oil film.

In a further aspect of the present invention, there is provided a sliding element slidable relative to a counterpart element via a lubricating oil film therebetween, the sliding element and the counterpart element being made of metal, the sliding element comprising a sliding surface having a microscopic surface structure including: a) a base portion; b) dimples inward recessed from the base portion and separated from each other, a ratio of a sum of opening areas of the dimples to an area of the at least one of the surfaces being in a range of 5% to 60%; and c) a peripheral portion defining the opening area of each of the dimples, the peripheral portion extending along a periphery of each of the dimples, the peripheral portion having a height smaller than a thickness of the lubricating oil film.

In a still further aspect of the present invention, there is provided a method for producing a microscopic surface structure in a first sliding element forming a sliding structure in cooperation with a second sliding element, the first and second sliding elements being made of metal and including sliding surfaces relatively slidable via a lubricating oil film therebetween, the microscopic surface structure including a base portion, dimples inward recessed from the base portion and separated from each other, a ratio of a sum of opening areas of the dimples to an area of the surface of the sliding element being in a range of 5% to 60%, and a peripheral portion defining the opening area of each of the dimples, the peripheral portion extending along a periphery of each of the dimples, the peripheral portion having a height smaller than a thickness of the lubricating oil film, the method comprising:

subjecting the sliding surface of the first sliding element to blasting to form a previous microscopic surface structure which includes the base portion, the dimples and projections extending outward from the base portion and along a periphery of each of the dimples, the projections having a second height larger than the height of the peripheral portion; and subjecting the sliding surface of the sliding element to surface finishing to reduce the second height of the projections and form the previous microscopic surface structure into the microscopic surface structure.

DESCRIPTION OF THE INVENTION

Figure 2A:
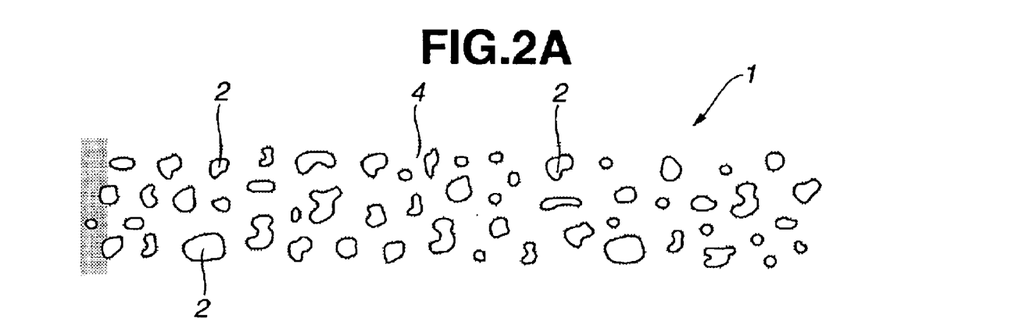
FIG. 2A is a plan view of a microscopic surface structure obtained by subjecting the sliding surface of FIG. 1A to lapping.
Figure 2B:
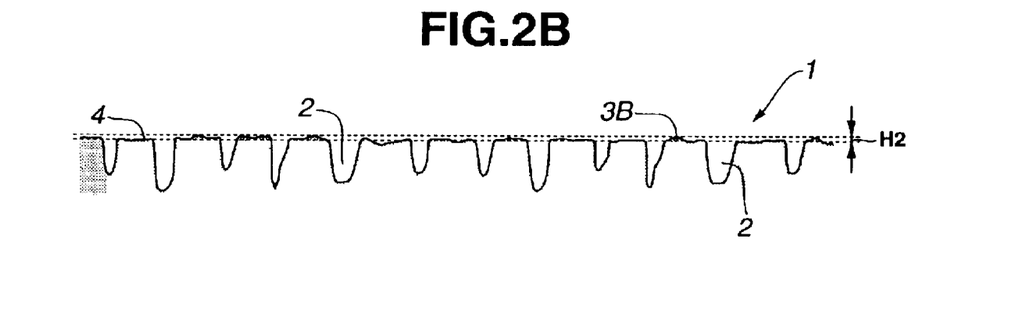
FIG. 2B is a schematic section of the microscopic surface structure of FIG. 2A.

Referring to the drawings, there is explained a sliding structure of the present invention. The sliding structure includes two opposed sliding elements which are made of metal and have opposed sliding surfaces relatively slidable via a lubricating oil film formed therebetween. At least one of the sliding surfaces has a microscopic surface structure described hereinafter. As illustrated in FIGS. 2A–2B, the microscopic surface structure of sliding element 1 includes base portion 4, generally circular dimples or recessed portion 2 inward recessed from base portion 4 and separated from each other, and peripheral portion 3B extending upward from base portion 4 and along the periphery of each of dimples 2. Peripheral portion 3B surrounds each of dimples 2 and defines an opening area of each of dimples 2. A ratio of a sum of the opening areas of dimples 2 to an area of the sliding surface is in a range of 5% to 60%. Preferably, the ratio is in a range of 15% to 40%. A size of each of dimples 2 may be in a range of 5 μm to 100 μm in equivalent round diameter. A depth of each of dimples 2 may be in a range of 0.3 μm to 5.0 μm. Peripheral portion 3B has height H2 smaller than a thickness of the lubricating oil film. Height H2 is preferably 0.5 μm or less. A surface roughness of base portion 4, which is expressed in terms of Ra prescribed in JIS B 0601-1994, may be 0.15 μm or less. Further, dimples 2 may be formed in the sliding surface of one of the sliding elements which has a hardness larger than the other thereof, in order to prevent dimples 2 from being worn out over a time period of the relative sliding motion of the sliding elements. One of the sliding elements may be a crankshaft of an internal combustion engine, and the microscopic surface structure of the sliding surface thereof may be formed in a crank journal (a main bearing journal) and a crankpin (a connecting rod journal) of the crankshaft.

Figure 1A:
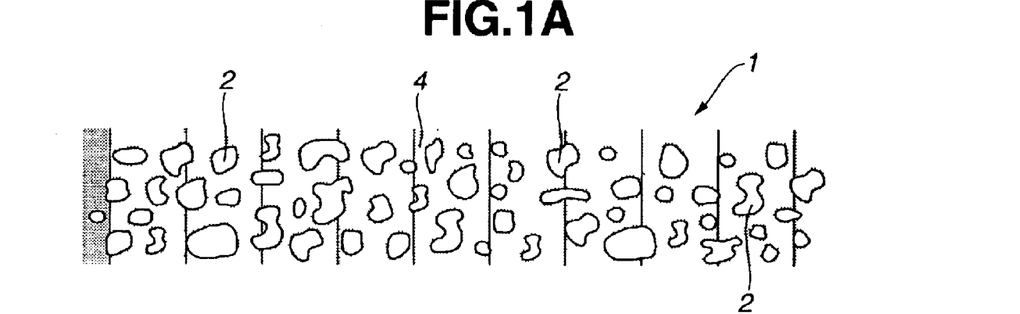
FIG. 1A is a plan view of a microscopic surface structure of a sliding surface of a sliding element according to an embodiment of the present invention, which is obtained by shot blasting or shot peening at a first stage in the production.
Figure 1B:
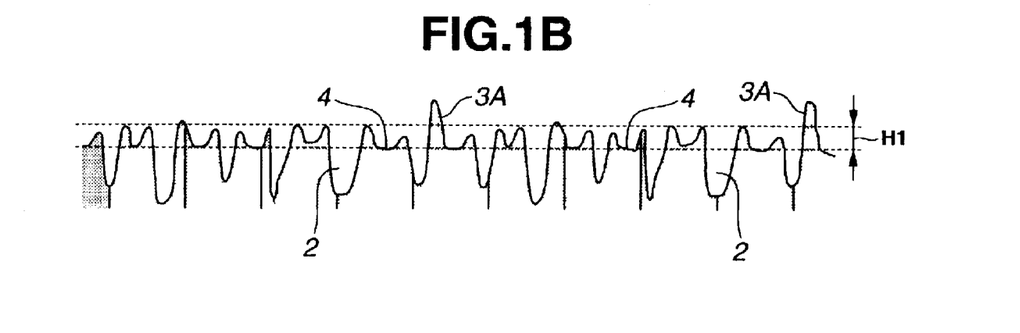
FIG. 1B is a schematic section of the microscopic surface structure of FIG. 1A.

The microscopic surface structure as shown in FIGS. 2A–2B is produced by the following method. First, a sliding surface of sliding element 1 is subjected to blasting with shots having a diameter of 10 μm to 200 μm. The blasting operation may be either of sandblasting and shot peening. Steel balls and ceramic balls may be used as the shots. By the blasting operation, the sliding surface has a previous microscopic surface structure shown in FIGS. 1A–1B. The previous microscopic surface structure includes base portion 4, generally circular dimples 2 inward recessed from base portion 4, and projections 3A upward projecting from base portion 4 and extending along the peripheries of dimples 2. Projections 3A thus surrounding dimples 2 separate dimples 2 from one another. Flat base portion 4 is disposed between adjacent two projections 3A as shown in FIG. 1B. Next, the sliding surface of sliding element 1 is subjected to surface finishing including lapping, barrel polishing or the like, to form the previous microscopic surface structure as shown in FIGS. 1A–1B into the microscopic surface structure as shown in FIGS. 2A–2B. Namely, by the surface finishing operation, height H1 of projections 3A which is larger than height H2 of peripheral portions 3B is reduced. Projections 3A may be lapped until height H2 of peripheral portions 3B becomes 0 μm. Thus, the microscopic surface structure of the sliding surface of sliding element 1 is brought into a generally smoothened state as shown in FIG. 2B in comparison with the previous microscopic surface structure of the sliding surface of sliding element 1 as shown in FIG. 1B. The thus-provided microscopic surface structure has the above-described properties in terms of dimples 2, base portion 4 and peripheral portions 3B.

Since the microscopic surface structure of the sliding surface of sliding element 1 which includes dimples 2 and peripheral portions 3B relatively flattened as shown in FIG. 2B, occurrence of contact of peripheral portions 3B with a sliding surface of the counterpart sliding element can be restrained. Further, with the formation of dimples 2, shear resistance of the lubricating oil between the sliding surfaces can be reduced. If the thickness of the lubricating oil film between the sliding surfaces is relatively large, sliding resistance of the sliding surfaces can be considerably reduced as compared with simply smooth sliding surfaces. Further, even if the thickness of the lubricating oil film between the sliding surfaces is relatively small, dimples 2 can retain the lubricating oil so that friction caused between the sliding surfaces will be lowered. Wear resistance and antiseizure properties of the sliding surfaces also can be improved.

With the provision of peripheral portions 3B around dimples 2 as shown in FIG. 2B, which have relatively small height H2 smaller than a thickness of the lubricating oil film between the sliding surfaces, occurrence of metal-to-metal contact between the opposed sliding surfaces of sliding element 1 and the counterpart sliding element can be suppressed even when the thickness of the lubricating oil film between the sliding surfaces becomes small. Further, even when the engine is operated at low speed or with the lubricating oil at high temperature, friction caused between the sliding surfaces can be effectively reduced. If height H2 of peripheral portion 3B is larger than 0.5 μm or the surface roughness Ra of base portion 4 is larger than 0.15 μm, metal-to-metal contact will occur at relatively high speed range of the engine operation. This will cause increase in friction and acceleration in wear of the sliding surface of the counterpart sliding element. Further, if the ratio of a sum of opening areas of dimples 2 to the whole area of the sliding surface is less than 5%, the sliding surface will be substantially equivalent to that having no dimples. If the ratio of a sum of opening areas of dimples 2 to the area of the sliding surface is more than 60%, the actual pressure of contact between the sliding surfaces will increase. Further, in such a case, adjacent dimples 2 will be connected with each other and allow the lubricating oil retained in dimples 2 to flow therefrom. This will accelerate the wear caused on the sliding surface, increasing the sliding resistance thereof. In order to obtain the effect of reducing friction as described above in a more extensive range of the sliding conditions, the ratio of a sum of opening areas of dimples 2 to the area of the sliding surface is preferably in a range of 10% to 40%.

If the equivalent round diameter of each of dimples 2 is less than 5 $\mu$m, the sliding surface will be substantially equivalent to that having no dimples. If the equivalent round diameter of each of dimples 2 is more than 100 $\mu$m, the equivalent round diameter will be too large relative to the contact area between the sliding surfaces of the sliding element and the counterpart sliding element. This will lessen the effect of reducing friction. Further, if the depth of each of dimples 2 is less than 0.3 $\mu$m, the effect of reducing friction will be deteriorated. Furthermore, even if the depth of each of dimples 2 is more than 5.0 $\mu$m, more excellent effect of reducing friction cannot be obtained.

Figure 7:
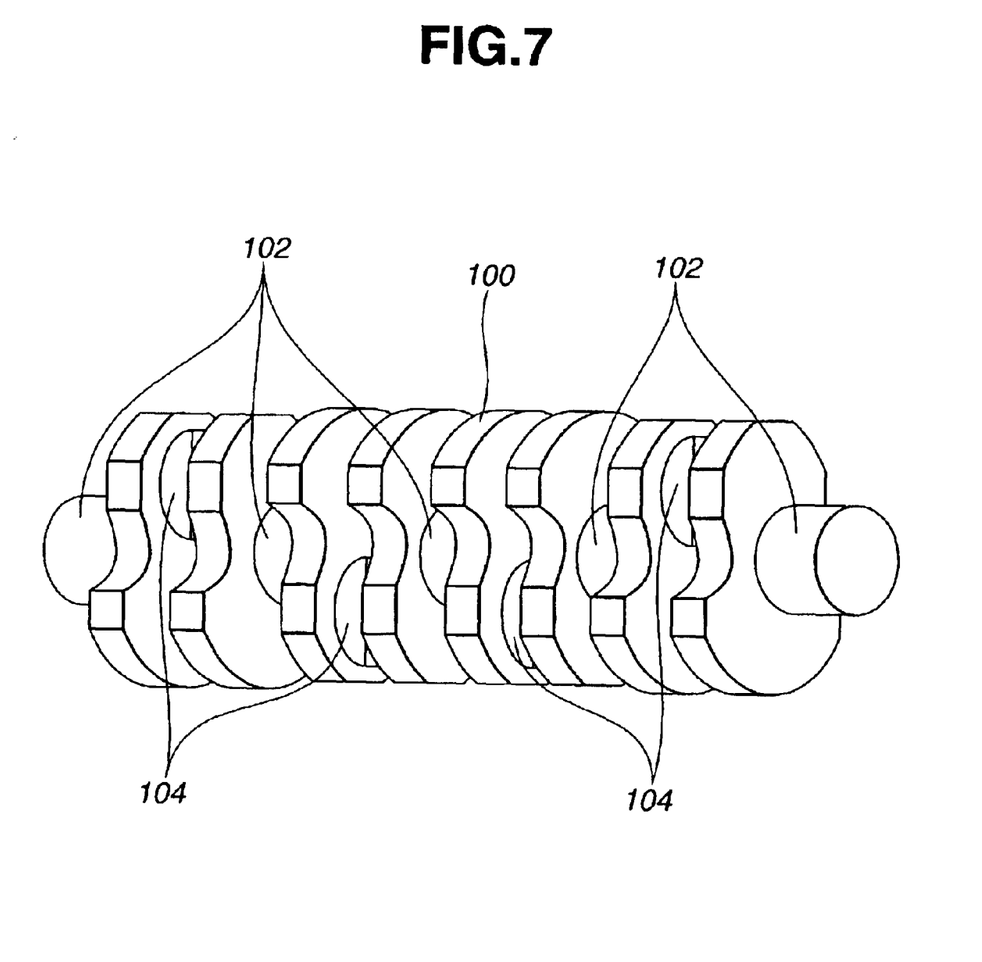
FIG. 7 is a perspective view of a crankshaft of an internal combustion engine.
Figure 8:
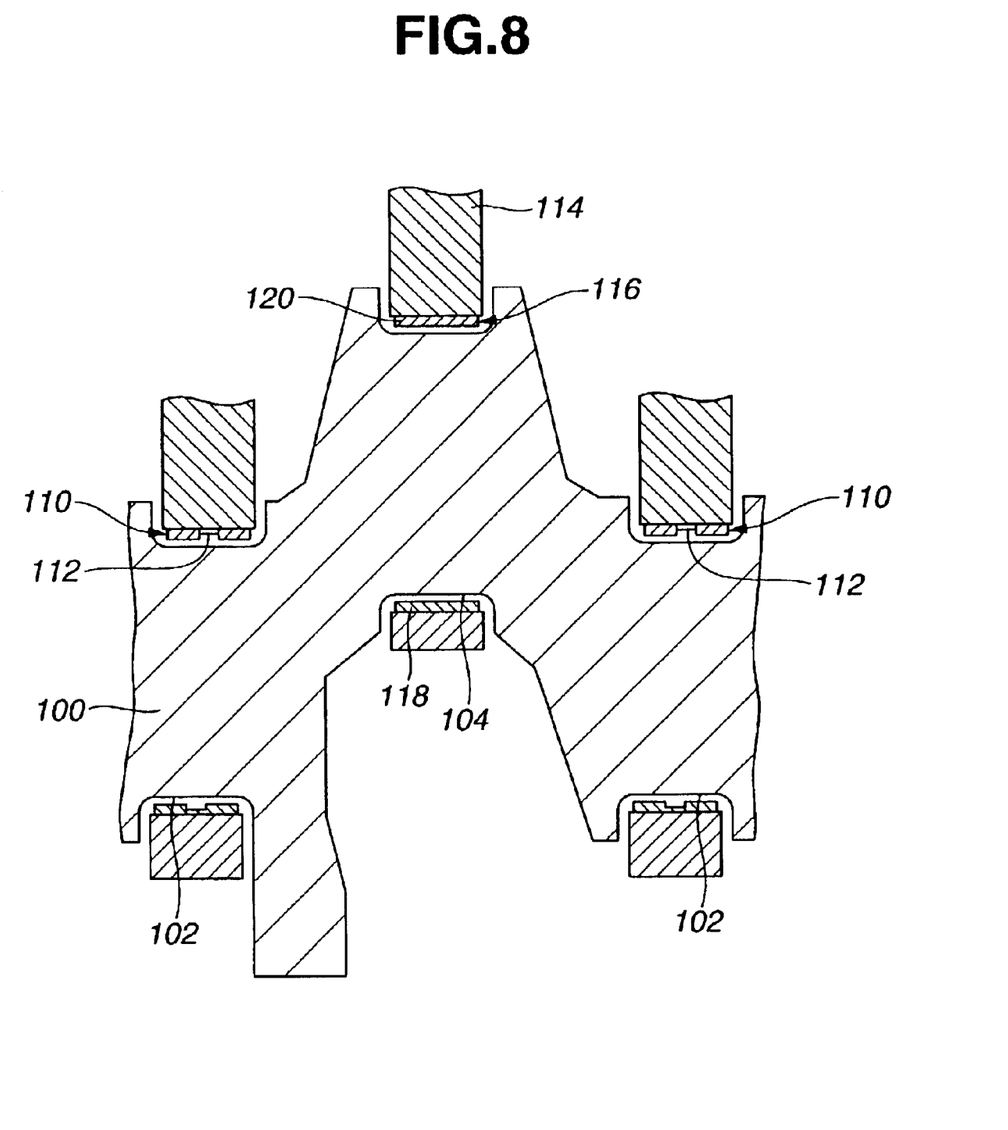
FIG. 8 is a sectional view of a sliding structure used in the internal combustion engine.

The sliding structure of the invention are applicable to the combination of a crankshaft of an internal combustion engine and the corresponding bearing metal. Further, in the combination, at least one of the sliding surfaces may be located at the crank journal and the crankpin. FIGS. 7 and 8 respectively show typical examples of a crankshaft of an internal combustion engine and the sliding structure constituted of the crankshaft and the corresponding bearing metals, to which the sliding element and the sliding structure of the invention are applicable. As illustrated in FIG. 7, crankshaft 100 includes crank journal 102 and crankpin 104. As illustrated in FIG. 8, crank journal 102 is supported by bearing metal 110 of a crankcase main bearing, and crankpin 104 is supported by bearing metal 116 of a crankpin end bearing through which crankpin end (big end) 114 of a connecting rod is coupled to crankpin 104. Bearing metal 116 includes lower and upper bearing metals 118 and 120. Crank journal 102 has a sliding surface opposed to a sliding surface of bearing metal 110. The opposed sliding surfaces of crank journal 102 and bearing metal 110 are lubricated with lubricating oil which is supplied to groove 112 of bearing metal 110 via a supply passage, not shown, formed in the crankcase main bearing. A lubricating oil film is formed in a clearance between the opposed sliding surfaces of crank journal 102 and bearing metal 110. Crankpin 104 has a sliding surface opposed to a sliding surface of bearing metal 116. Lubricating oil is supplied to a clearance between the opposed sliding surfaces of crankpin 104 and bearing metal 116 via an oil passage, not shown, formed in crankshaft 100, whereby a lubricating oil film is formed in the clearance therebetween.

EXAMPLES

The present invention is described in more detail by way of examples by referring to the accompanying drawings. However, these examples are only illustrative and not intended to limit a scope of the present invention thereto.

Example 1

A crankshaft for an internal combustion engine which was made of carbon steel and included a crank journal and a crankpin each having a diameter of 40 mm, was prepared. The crank journal and the crankpin were subjected to blasting under condition A shown in Table 1. The blasting operation was conducted under low-pressure blasting air with a small amount of shots for a short period of time, as compared with condition B which was a standard condition of the conventional blasting operation. The crank journal and the crankpin were provided with the sliding surfaces each having a previous microscopic surface structure as illustrated in FIGS. 1A and 1B, which included base portion 4, dimples 2 and projections 3A surrounding dimples 2.

TABLE 1

| Shot blasting condition | | Condition A | Condition B | Condition C |
|---|---|---|---|---|
| Nozzle diameter (mm) | | 6 | 6 | 6 |
| Shooting pressure (MPa) | | 0.2 | 0.5 | 0.7 |
| Shooting distance (mm) | | 100 | 100 | 100 |
| Weight used (kg/min) | | 0.1 | 0.5 | 0.5 |
| Workpiece rotating speed (rpm) | | 32 | 8 | 4 |
| Blasting time (sec) | | 4 | 60 | 60 |
| Shot | Material | Steel ball | Steel ball | Steel ball |
| | Diameter ($\mu$m) | 50 | 50 | 50 |
| | Hardness (Hv) | 800 | 800 | 800 |

Figure 3:
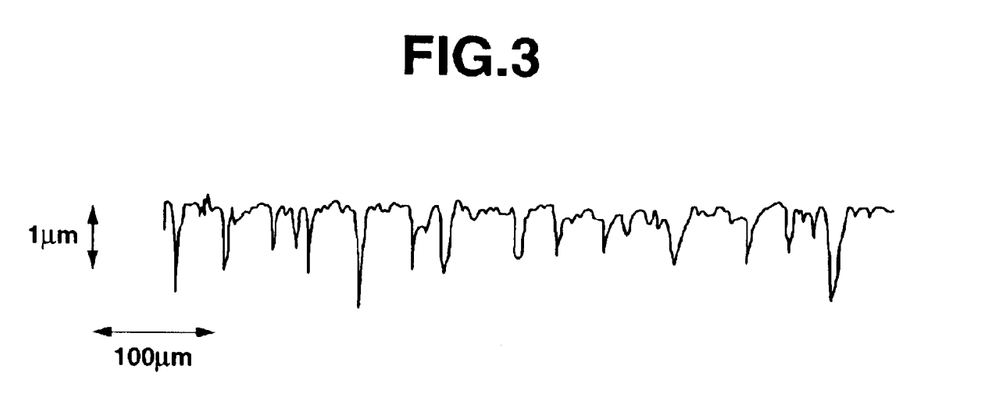
FIG. 3 is an enlarged diagram showing a surface roughness profile of the sliding surface of the sliding element according to the embodiment of the present invention, which is finally obtained.
Figure 4:
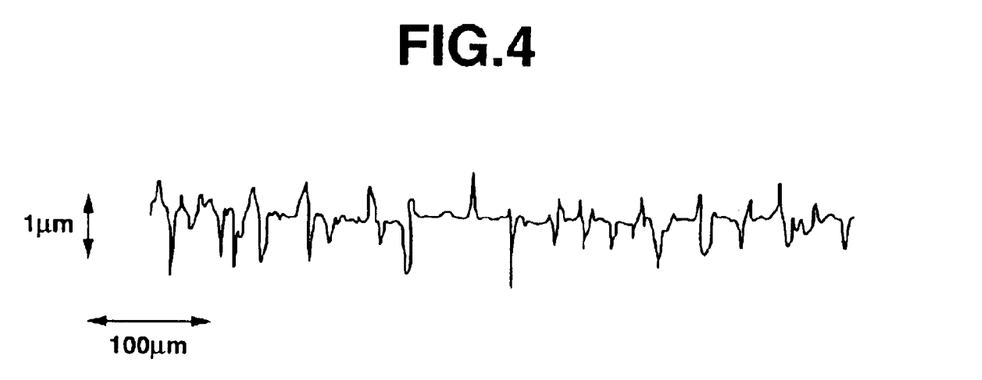
FIG. 4 is an enlarged diagram showing a surface roughness profile obtained by blasting before the sliding surface of the sliding element of FIG. 3 is obtained.
Figure 6:
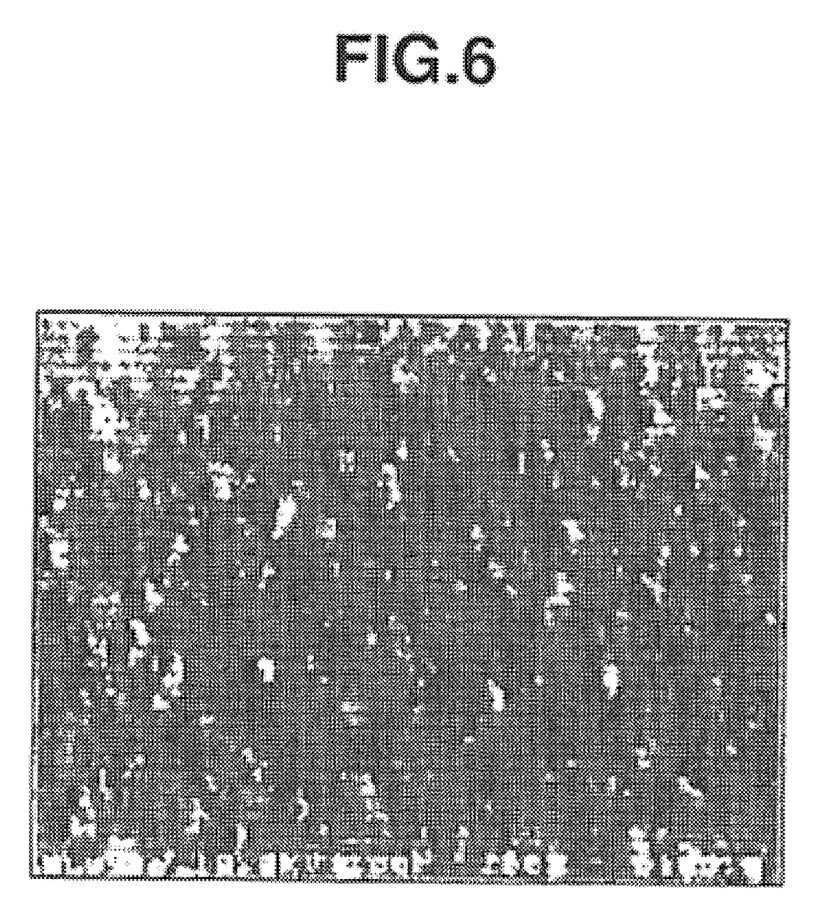
FIG. 6 is a diagram showing the microscopic surface structure of the sliding surface shown in FIG. 3.

After the blasting operation, the sliding surface of each of the crank journal and the crankpin was subjected to surface finishing with a lapping tape to form the microscopic surface structure from the previous microscopic surface structure. By the lapping operation, the height of projections 3A were reduced, and the surface roughness Ra of base portion 4 was adjusted to 0.05 $\mu$m. FIG. 3 shows the surface roughness profile of the sliding surface obtained by the lapping, and FIG. 6 shows the microscopic surface structure thereof at the magnification of 340, respectively. For reference purposes, the surface roughness profile of the sliding surface obtained by the blasting operation before the lapping operation is shown in FIG. 4. Three portions of the sliding surface were selected and subjected to measurement of properties of dimples 2. The equivalent round diameter of dimples 2 were in the range of 10 $\mu$m to 12 $\mu$m. The ratio of a sum of opening areas of dimples 2 to an area of the sliding surface was in the range of 19% to 23%. The depth of dimples 2 was in the range of 0.8 $\mu$m to 1.5 $\mu$m.

Comparative Example 1

A crankshaft conventionally used was prepared. The crank journal and the crankpin of the crankshaft were subjected to finishing. The sliding surface of each of the crank journal and the crankpin had the surface roughness Ra of 0.07 $\mu$m.

Comparative Example 2

The crank journal and the crankpin of the crankshaft used in Comparative Example 1 were subjected to only blasting under the same condition as described in Example 1, namely, under condition A of Table 1. The sliding surface of each of the crank journal and the crankpin had the surface roughness profile shown in FIG. 4. The sliding surface had the microscopic surface structure as shown in FIG. 1B. The average height of projections 3A as indicated at H1 in FIG. 1B was 0.7 µm.

Comparative Example 3

The crank journal and the crankpin of the crankshaft used in Comparative Example 1 were subjected to blasting under condition B shown in Table 1 and then subjected to lapping in the same manner as described in Example 1. The surface roughness Ra of base portion 4 of the microscopic surface structure of the sliding surface of each of the crank journal and the crankpin was 0.08 µm. Dimples 2 of the microscopic surface structure were connected together so that the equivalent round diameter of dimples 2 cannot be measured. The ratio of a sum of opening areas of dimples 2 to an area of the sliding surface was in the range of 60% to 65%.

Comparative Example 4

The crank journal and the crankpin of the crankshaft used in Comparative Example 1 were subjected to blasting under the same condition as described in Example 1, i.e., condition A, and then subjected to lapping for a time period longer than that in Example 1. The equivalent round diameter of dimples 2 were in the range of 5 µm to 11 µm. The ratio of a sum of opening areas of dimples 2 to an area of the sliding surface was in the range of 1.3% to 2.3%. The depth of dimples 2 was in the range of 0.14 µm to 0.28 µm.

Comparative Example 5

The crank journal and the crankpin of the crankshaft used in Comparative Example 1 were subjected to blasting under condition C shown in Table 1 and then subjected to lapping in the same manner as described in Example 1. The sliding surface had large roughness produced by shot blasting and no dimples. The surface roughness Ra of the sliding surface was about 0.23 µm.

Table 2 shows properties of the microscopic surface structure of the sliding surfaces obtained in Example and Comparative Examples 1–5.

TABLE 2

| | Shot blasting condition | Roughness Ra of base portion (µm) | Height of peripheral portion (µm) | Dimple ERD*1 (µm) | Depth (µm) | Area Ratio*2 (%) |
|---|---|---|---|---|---|---|
| Example 1 | A | 0.05 | 0.1 | 10–12 | 0.8–1.5 | 19–23 |
| Comparative Example 1 | — | 0.07 | — | — | — | — |
| Comparative Example 2 | A | 0.07 | 0.7 | 15–20 | 0.8–1.8 | 19–25 |
| Comparative Example 3 | B | 0.08 | 0.1 | Continuous | 0.9–1.7 | 60–65 |
| Comparative Example 4 | A | 0.05 | None | 5–11 | 0.14–0.28 | 1.3–2.3 |
| Comparative Example 5 | C | 0.23 | — | — | — | — |

Figure 5:
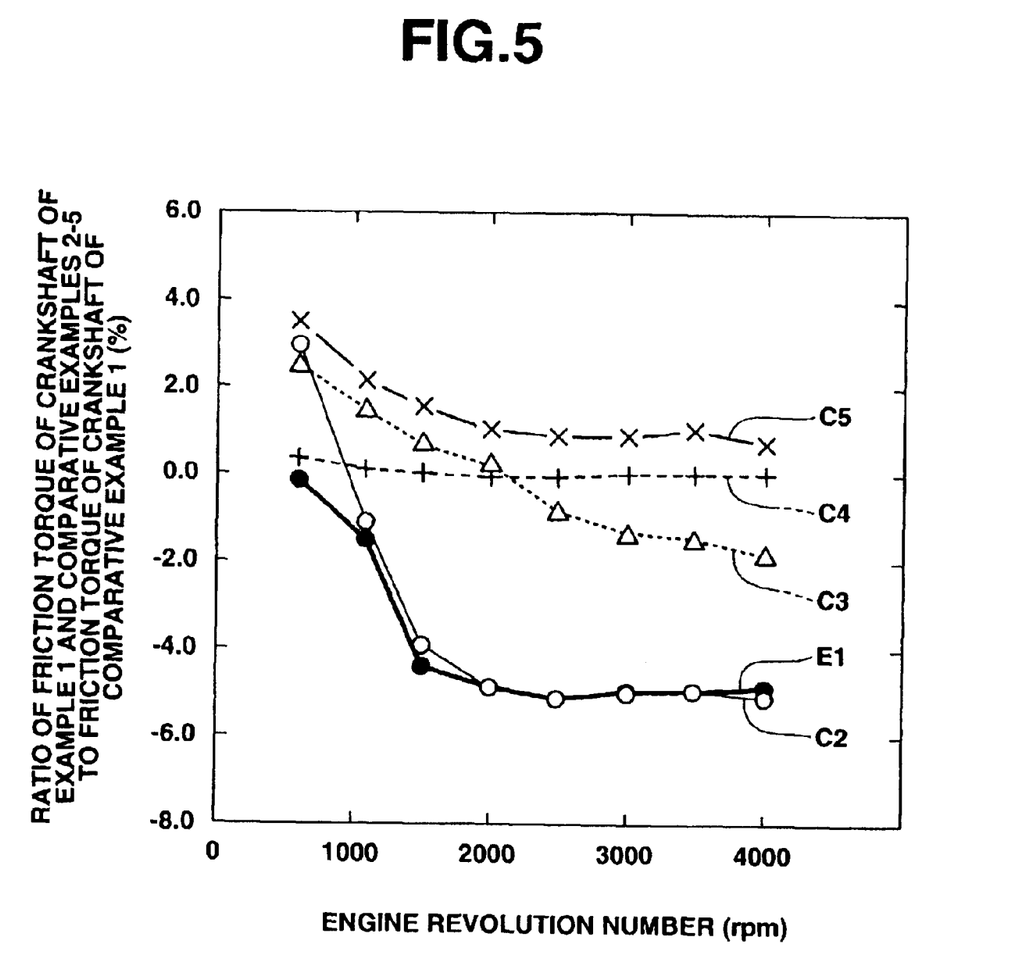
FIG. 5 is a graph showing results of evaluation of a ratio of friction caused in sliding elements of Example and Comparative Examples 2–5 to friction caused in a sliding element of Comparative Example 1.

Notes:
*1Equivalent round diameter
*2Ratio of a sum of opening areas of dimples to an area of the sliding surface The crankshafts obtained in Example 1 and Comparative Examples 1–5 were respectively installed to an engine and subjected to motoring test to measure friction torque generated at various values of the engine revolution number. Commercial engine oil 5W-30 SJ was used. The temperature of oil within an oil pan was constant at 80° C. A ratio of the friction torque of the crankshaft obtained in each of Example and Comparative Examples 2–5 to the friction torque of the crankshaft obtained in Comparative Example 1 was evaluated. FIG. 5 shows results of the evaluation. In FIG. 5, plotted line E1 indicates the evaluation result of Example, and plotted lines C2–C5 indicate the evaluation results of Comparative Examples 2–5, respectively.

It was found from FIG. 5 that the friction caused in the crankshaft of Example 1 was reduced over the entire range of the engine revolution number as compared with the crankshaft of Comparative Example 1. On the other hand, the friction caused in the crankshaft of Comparative Example 2 was increased at the engine revolution number of about 1000 rpm or less as compared with the crankshaft of Comparative Example 1. The friction caused in the crankshaft of Comparative Example 3 was increased at the engine revolution number of about 2000 rpm or less as compared with the crankshaft of Comparative Example 1. Meanwhile, a thickness of the lubricating oil film was about 0.5 µm at the engine revolution number of 1000 rpm or less.

Further, the friction caused in the crankshaft of Comparative Example 4 was substantially equal to that caused in the crankshaft of Comparative Example 1. This is because the dimples formed in the sliding surface of the crankshaft of Comparative Example 4 have the small depth and the small ratio of a sum of opening areas thereof to an area of the sliding surface. As a result, the effect of reducing friction cannot be obtained. The friction caused in the crankshaft of Comparative Example 5 was further increased as compared with that caused in the crankshaft of Comparative Example 1 due to deterioration of the surface roughness which was caused by the blasting under condition C. Furthermore, there occurred no scar in a sliding surface of a bearing metal used as the counterpart in Example 1. It was recognized that the crankshaft of Example 1 was prevented from causing wear and damage in the sliding surface of the counterpart bearing metal.

As be appreciated from the above explanation, with the sliding structure of the invention, the mutual contact between projections of the microscopic surface structure of the opposed sliding surfaces of the sliding elements can be reduced. Further, with the provision of the dimples of the microscopic surface structure, shear resistance of the lubricating oil between the sliding surfaces can be decreased. Therefore, even when a thickness of the lubricating oil film between the sliding surfaces is relatively small, the sliding resistance caused therebetween can be considerably reduced as compared with that between simply smooth sliding surfaces. This serves for enhancing wear resistance of the sliding surfaces of the sliding elements. The present invention can provide the sliding element having the sliding surface with the excellent wear resistance.

This application is based on a prior Japanese Patent Application No. 2001-386939 filed on Dec. 20, 2001, the entire content of which is hereby incorporated by reference.

Although the invention has been described above by reference to a certain embodiment and example of the invention, the invention is not limited to the embodiment and example described above. Modifications and variations of the embodiment and example described above will occur to those skilled in the art in light of the above teachings. The scope of the invention is defined with reference to the following claims.

What is claimed is:

1. A sliding structure, comprising:
   a first sliding element including a first sliding surface, the first sliding element being made of metal;
   a second sliding element including a second sliding surface slidable relative to the first sliding surface via a lubricating oil film therebetween, the second sliding element being made of metal;
   at least one of the first and second sliding surfaces including a microscopic surface structure including a base portion, dimples inward recessed from the base portion and separated from one another, a ratio of a sum of opening areas of the dimples to an area of the at least one of the first and second surfaces being in a range of 5% to 60%, and a peripheral portion defining the opening area of each of the dimples, the peripheral portion extending along a periphery of each of the dimples, the peripheral portion having a height smaller than a thickness of the lubricating oil film.

2. The sliding structure as claimed in claim 1, wherein the height of the peripheral portion is not more than 0.5 μm on average.

3. The sliding structure as claimed in claim 2, wherein the height of the peripheral portion is not less than 0 μm.

4. The sliding structure as claimed in claim 3, wherein the at least one of the first and second surfaces has a hardness larger than the other thereof.

5. The sliding structure as claimed in claim 1, wherein the base portion has a surface roughness Ra of not more than 0.15 μm.

6. The sliding structure as claimed in claim 5, wherein each of the dimples has an equivalent round diameter of 5 μm to 100 μm and a depth of 0.3 μm to 5.0 μm.

7. The sliding structure as claimed in claim 1, wherein the dimples are formed by either of shot blasting and shot peening using either of steel balls and ceramic balls which have a diameter of 10 μm to 200 μm, the peripheral portion being formed by either of lapping and barrel polishing.

8. The sliding structure as claimed in claim 1, wherein one of the first and second sliding elements is a crankshaft of an internal combustion engine, and the sliding surface thereof is located at a crank journal of the crankshaft.

9. The sliding structure as claimed in claim 1, wherein one of the first and second sliding elements is a crankshaft of an internal combustion engine, and the sliding surface thereof is located at a crankpin of the crankshaft to which a crankpin end of a connecting rod is coupled.

10. A sliding element slidable relative to a counterpart element via a lubricating oil film therebetween, the sliding element and the counterpart element being made of metal, the sliding element comprising a sliding surface having a microscopic surface structure including: a) a base portion; b) dimples inward recessed from the base portion and separated from each other, a ratio of a sum of opening areas of the dimples to an area of the at least one of the surfaces being in a range of 5% to 60%; and c) a peripheral portion defining the opening area of each of the dimples, the peripheral portion extending along a periphery of each of the dimples, the peripheral portion having a height smaller than a thickness of the lubricating oil film.

11. The sliding element as claimed in claim 10, wherein the height of the peripheral portion is not more than 0.5 μm on average.

12. The sliding element as claimed in claim 11, wherein the height of the peripheral portion is not less than 0 μm.

13. The sliding element as claimed in claim 10, wherein the base portion has a surface roughness Ra of not more than 0.15 μm.

14. The sliding element as claimed in claim 13, wherein each of the dimples has an equivalent round diameter of 5 μm to 100 μm and a depth of 0.3 μm to 5.0 μm.

15. The sliding element as claimed in claim 10, wherein the dimples are formed by either of shot blasting and shot peening using either of steel balls and ceramic balls which have a diameter of 10 μm to 200 μm, the peripheral portion being formed by either of lapping and barrel polishing.

16. The sliding element as claimed in claim 10, wherein the sliding element is a crankshaft of an internal combustion engine, the sliding surface being located at a crank journal of the crankshaft.

17. The sliding element as claimed in claim 10, wherein the sliding element is a crankshaft of an internal combustion engine, the sliding surface being located at a crankpin of the crankshaft to which a crankpin end of a connecting rod is coupled.

18. A method for producing a microscopic surface structure in a first sliding element forming a sliding structure in cooperation with a second sliding element, the first and second sliding elements being made of metal and including sliding surfaces relatively slidable via a lubricating oil film therebetween, the microscopic surface structure including a base portion, dimples inward recessed from the base portion and separated from each other, a ratio of a sum of opening areas of the dimples to an area of the surface of the sliding element being in a range of 5% to 60%, and a peripheral portion defining the opening area of each of the dimples, the peripheral portion extending along a periphery of each of the dimples, the peripheral portion having a height smaller than a thickness of the lubricating oil film, the method comprising:
   subjecting the sliding surface of the first sliding element to blasting to form a previous microscopic surface structure which includes the base portion, the dimples and projections extending outward from the base portion and along a periphery of each of the dimples, the projections having a second height larger than the height of the peripheral portion; and
   subjecting the sliding surface of the sliding element to surface finishing to reduce the second height of the projections and form the previous microscopic surface structure into the microscopic surface structure.

19. The method as claimed in claim 18, wherein the blasting operation is conducted using either of steel balls and ceramic balls which have a diameter of 10 μm to 200 μm.

20. The method as claimed in claim 18, wherein the surface finishing operation is either of lapping and barrel polishing.

21. The method as claimed in claim 18, wherein the height of the peripheral portion is not more than 0.5 μm on average.

22. The method as claimed in claim 21, wherein the height of the peripheral portion is not less than 0 μm.

23. The method as claimed in claim 18, wherein the base portion has a surface roughness Ra of not more than 0.15 μm.

24. The method as claimed in claim 23, wherein each of the dimples has an equivalent round diameter of 5 μm to 100 μm and a depth of 0.3 μm to 5.0 μm.

25. The method as claimed in claim 18, wherein the first sliding element is a crankshaft of an internal combustion engine, and the sliding surface thereof is located at a crank journal of the crankshaft.

26. The method as claimed in claim 18, wherein the first sliding element is a crankshaft of an internal combustion engine, and the first surface thereof is located at a crankpin of the crankshaft to which a crankpin end of a connecting rod is coupled.

* * * * *